United States Patent [19]
Gatos

[11] 3,855,237
[45] Dec. 17, 1974

[54] PROCESS OF MAKING HEXAHYDRO-1H-FURO(3,4-C) PYRROLE

[75] Inventor: George C. Gatos, Wilmington, Del.

[73] Assignee: ICI America Inc., Wilmington, Del.

[22] Filed: June 14, 1973

[21] Appl. No.: 370,009

[52] U.S. Cl. ............................................. 260/326.8
[51] Int. Cl. ....................................... C07d 59/00
[58] Field of Search ................... 260/326.5 B, 326.8

[56] References Cited
OTHER PUBLICATIONS

Chemical Abstracts, Vol. 71, (1969), p. 124295K, Pg. 144.
Chemical Abstracts, Vol. 67, (1967), p. 32.526(a), pg. 3070.
Journal Organic Chemistry, (1955), 20 pg. 1139–1145 by Williams et al.
Journal Organic Chemistry, (1954), 19 pg. 1671–1680 by Kornfeld et al.
Berichte der Deutschen Chemischen Gesellschaft. 70, (1937), by Alder et al., Pg. 1354.

Primary Examiner—Elbert L. Roberts

[57] ABSTRACT

A process of making hexahydro-1H-furo (3,4-c)pyrrole is disclosed which involves (a) reacting 3,4-bis(hydroxymethyl)furan with a ketone or aldehyde to form 3,4-bis (hydroxymethyl)furan-ketal or -acetal or reacting 3,4-bis(hydroxymethyl)furan with a low molecular weight ketal or acetal by a ketal or acetal interchange reaction to form the corresponding 3,4-bis(hydroxymethyl)furan-ketal or -acetal; (b) hydrogenating the product of step (a) to form the corresponding cis 3,4-bis(hydroxymethyl)tetrahydrofuran-ketal or -acetal; (c) hydrolyzing the product of step (b) to form cis 3,4-bis(hydroxymethyl)tetrahydrofuran; (d) reacting the product of step (c) with a compound so as to replace the two hydroxyl groups of the product of step (c) with two groups selected from the group consisting of sulfonyl groups or halogens; and then (e) reacting the product of step (d) with ammonia to yield the named product or reacting the product of step (d) with an alkylamine or aralkylamine to form the corresponding cyclized product which in turn is dealkylated or dearalkylated to yield the named product.

3 Claims, No Drawings

PROCESS OF MAKING HEXAHYDRO-1H-FURO(3,4-C) PYRROLE

This invention relates to a novel method for the preparation of hexahydro-1H-furo(3,4-c)pyrrole.

Pharmacological studies indicate that hexahydro-1H-furo(3,4-c)pyrrole is useful in alleviating pain in living animal bodies, more particularly, mammalian bodies. In particular, testing of the subject compound has indicated that it has analgesic properties when administered in pharmacologically effective dosages.

It is an object of the present invention to provide a method of preparing hexahydro-1H-furo(3,4-c)pyrrole.

It is another object of the present invention to provide a novel and direct method of preparing hexahydro-1H-furo(3,4-c) pyrrole.

It is a further object of the present invention to provide a novel and direct method of preparing hexahydro-1H-furo(3,4-c)pyrrole without forming any intermediate product which is a trans isomer.

These and other objects of the present invention are accomplished by a method which comprises (a) reacting 3,4-bis (hydroxymethyl)furan with a ketone or aldehyde to form 3,4-bis (hydroxymethyl)furan-ketal or -acetal or reacting 3,4-bis (hydroxymethyl)furan with a low molecular weight ketal or acetal 64 a ketal or acetal interchange reaction to form the corresponding 3,-4-bis(hydroxymethyl)furan-ketal or -acetal; (b) hydrogenating the product of step (a) to form the corresponding cis 3,4-bis(hydroxymethyl)tetrahydrofuran-ketal or -acetal; (c) hydrolyzing the product of step (b) to form cis 3,4-bis (hydroxymethyl)tetrahydrofuran; (d) the product of step (c) with a compound so as to replace the two hydroxyl groups of the product of step (c) with two groups selected from the group consisting of sulfonyl groups or halogens; and then (e) reacting the product of step (d) with ammonia to yield the named product or reacting the product of step (d) with an alkylamine or aralkylamine to form the corresponding cyclized product which in turn is dealkylated or dearalkylated to yield the named product.

The starting material 3,4-bis(hydroxymethyl)furan used in the present process can be prepared from 3,4-bis(acetoxymethyl)furan by a methanolysis or hydrolysis reaction. The compound 3,4-bis(acetoxymethyl)furan can be purchased, for example, from the Aldrich Chemical Co., Inc., Milwaukee, Wisconsin, or prepared by methods described by H. Williams, P. Kaufmann, and H. S. Mosher, Journal Organic Chemistry 20, 1,139–1,145 (1955), K. Alder and H. F. Rickett, Berichte der Deutschen Chemischen Gesellschaft 70, 1354 (1937), and E. C. Kornfeld and R. G. Jones, journal Organic Chemistry 19, 1,671–1,680 (1954).

More particularly, step (a) of the present process involves reacting 3,4-bis(hydroxymethyl)furan (II) with a sufficient amount of ketone, aldehyde, or low molecular weight ketal or acetal so as to result in the formation of the corresponding 3,4-bis(hydroxymethyl)furan-ketal or -acetal. The reactants are generally used at a concentration of about one mole 3,4-bis (hydroxymethyl)furan to about two to three moles of ketone, aldehyde, or low molecular weight ketal or acetal. Among the ketone, aldehyde, and low molecular weight ketals and acetals that can be used are, for example, acetone, 3-pentanone, benzaldehyde, acetaldehyde, 2,2-dimethoxypropane, 2,2-dimethoxybutane, and chloracetaldehyde diethyl acetal. An acid catalyst such as p-toluenesulfonic acid or sulfuric acid is generally used to catalyze the reaction of step (a) and this reaction is generally carried out at room temperature at atmospheric pressure. However, when indicated, elevated temperature can be used.

The hydrogenation of 3,4-bis(hydroxymethyl)furan-ketal or -acetal to the corresponding cis 3,4-bis(hydroxymethyl)tetrahydrofuran-ketal or -acetal in accordance with the subject process is accomplished by known standard techniques using any known hydrolyzation catalyst, such as nickel and platinum metals in a hydrogen atmosphere having a pressure within the range of from about 600 to 1,200 psig at a temperature within the range of from about 120°C. to 135°C. In carrying out the present hydrogenation reaction, the reactant 3,4-bis(hydroxymethyl)furan-ketal or -acetal is first dissolved in a suitable inert organic solvent such as benzene, toluene, or dioxane.

It was found that when 3,4-bis(hydroxymethyl)furan (II) is hydrogenated by standard techniques of hydrogenation, a product containing about 50% cis and 50% trans 3,4-bis(hydroxymethyl)tetrahydrofuran is obtained.

Step (c) of the subject process involves hydrolyzing cis 3,4-bis(hydroxymethyl)tetrahydrofuran-ketal tetrahydrofuran-ketal or-acetal by known conventional methods. In general, the product of step (b) of the present process is hydrolyzed in an excess of water containing a catalytic amount of an acid catalyst such as sulfuric acid or p-toluenesulfonic acid at room temperature and atmospheric pressure. The resulting reaction mixture is then neutralized with an aqueous base, such as sodium hydroxide to a pH of about 8 to 9. The resulting mixture is then vacuum stripped at about 0.05 to 0.2 mm Hg pressure at about 110°C. to 130°C. to yield the desired product cis 3,4-bis(hydroxymethyl) tetrahydrofuran.

In accordance with the present process, cis 3,4-bis(hydroxymethyl)tetrahydrofuran (VI) is then reacted with a suitable reactant so as to replace the two hydroxyl groups of 3,4-bis(hydroxymethyl)tetrahydrofuran with two groups selected from the group consisting of sulfonyl groups or halogens. In such a reaction, one mole of cis 3,4-bis(hydroxymethyl)tetrahydrofuran (VI) is suitably reacted with two moles of, for example, p-toluenesulfonyl chloride in a suitable organic solvent, such as pyridine, at a temperature within the range of about 0°C. to 10°C. Of course, a molar excess of p-toluenesulfonyl chloride can be used where indicated, but the unreacted excess will have to be separated from the desired reaction product cis 2,4-bis(tosyloxymethyl)tetrahydrofuran (VIII). As indicated above, it will be recognized by one skilled in the present art that other sulfonate-bearing groups such as methanesulfonyloxy groups or halogens such as chlorine can be used in carrying out the present step in place of the tosyloxy groups.

The product of step (d) of the present process can then be converted to hexahydro-1H-furo(3,4-c)pyrrole (IX) by reaction with an excess of ammonia at a temperature of about 130°C. to 175°C. at superatmospheric pressure of about 450 to 700 psig. The reaction product is then treated with a base such as a methanolic sodium hydroxide solution to neutralize the acidity and then washed with diethyl ether after which the desired product hexahydro-1H-furo(3,4-c)pyrrole is ultimately obtained by distillation at atmospheric pressure at about 182°C. to 188°C. Alternatively, the product of step (d) can be reacted with other amines such as benzylamine or ethylamine or the like to form the corresponding cyclized product which, in turn, can be suitably debenzylated or dealkylated as the case may be to yield hexahydro-1H-furo(3,4-c)pyrrole.

In a preferred embodiment, the present method comprises (a) reacting 3,4-bis(hydroxymethyl)furan with 2,2-dimethoxypropane to form 3,4-bis(hydroxymethyl)furan-isopropylidene ketal; (b) hydrogenating the product of step (a) to form cis 3,4-bis(hydroxymethyl)tetrahydrofuran-isopropylidene ketal; (c) hydrolyzing the product of step (b) to form cis 3,4-bis(hydroxymethyl)tetrahydrofuran; (d) reacting the product of step (c) with a compound so as to replace the two hydroxyl groups of the product of step (c) with two groups selected from the group consisting of sulfonyl groups or halogens; and then (e) reacting the product of step (d) with ammonia to yield hexahydro-1H-furo(3,4-c)pyrrole or reacting the product of step (d) with benzylamine to form 5-benzyl-hexahydro-1H-furo(3,4-c)pyrrole which in turn is debenzylated to form hexahydro-1H-furo(3,4-c)pyrrole.

A preferred embodiment of the present process involves initially reacting 3,4-bis(hydroxymethyl)furan (II) with 2,2-dimethoxypropane in an acidic aqueous solution, as shown in following Example 3, to prepare the isopropylidene ketal (VII). The ketal (VII) in turn can be hydrogenated as shown in Example 4 to form ketal (IV), which in turn can be hydrolyzed in an acidic-aqueous solution, as shown in following Example 5, to form cis 3,4-bis (hydroxymethyl)tetrahydrofuran (VI). One mol of cis 3,4-bis (hydroxymethyl)tetrahydrofuran (VI), as shown in following Example 6, is then reacted with about 2 mols of p-toluenesulfonyl chloride in pyridine to prepare cis 3,4-bis (tosyloxymethyl) tetrahydrofuran (VIII). Cis 3,4-bis(tosyloxymethyl)tetrahydrofuran in turn is reacted with an ammonia-alcohol solution under pressure as illustrated in Example 7 to form hexahydro-1H-furo (3,4-c)pyrrole. Alternatively, cis 3,4-bis (tosyloxymethyl) tetrahydrofuran can be reacted with benzylamine as illustrated in Example 8 to form the corresponding cyclized product such as 5-benzyl-hexahydro-1H-furo(3,4-c)pyrrole (IX). This product, (IX), in turn can be debenzylated as shown in Example 9 to form hexahydro-1H-furo(3,4-c)pyrrole.

The process of the subject invention can be carried out in accordance with the principles and teaching illustrated in the following examples of preferred embodiments of the present invention with particular reference to types of reactions, types of reactants, ratios of reactants, reaction solvents, reaction times, temperatures, pressure, purification steps and other cited conditions.

EXAMPLE 1

Methanolysis of 3,4-Bis(Acetoxymethyl)Furan

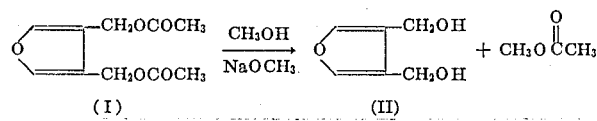

Methanol (2200 ml) was placed in a 5 liter, three-neck flask and 3 grams of sodium were added in small portions. The flask was equipped with a mechanical stirrer, an 8 inch Vigreaux column connected with a distillation heat and condenser. After the sodium was completely dissolved, 1374 grams (6.48 moles) of 3,4-bis(acetoxymethyl)furan, represented by formula (I), were added. The reaction mixture was heated at 60°C. and the methyl acetate distilled as it was formed. Less than 2 hours were required to remove all the methyl acetate. Finally, the excess methanol was distilled and 3,4-bis(hydroxymethyl)furan, represented by formula (II), remained in the flask. Gas liquid chromatography was used to monitor the reaction and determine purity of the product.

EXAMPLE 2

Hydrolysis of 3,4-Bis(Acetoxymethyl)Furan

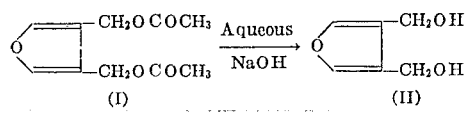

3,4-Bis(acetoxymethyl)furan, represented by formula (I), (1 kg, 4.71 moles) was placed in a three-neck flask equipped with a mechanical stirrer, thermometer, condenser, and dropping funnel. A solution of 500 grams (12.5 moles) of sodium hydroxide in 1,500 ml water was added slowly through the dropping funnel. After one hour the reaction became exothermic and the temperature rose to 74°C. Hydrolysis was followed by gas liquid chromatographic analysis (Column 2' Carbowax 20M, temperature 190°C.). The reaction mixture was then cooled (ice water bath) to room temperature and the product was extracted with diethyl ether. After five extractions (1 pound diethyl ether each time), the reaction mixture was concentrated (until salts began to precipitate) and extracted in a continuous extractor. The gas liquid chromatography analysis indicated that the hydrolysis was quantitative.

EXAMPLE 3

3,4-Bis(Hydroxymethyl)Furan — Isopropylidene Ketal (VII)

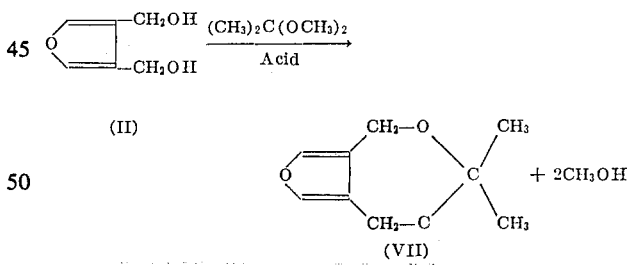

640 Grams (5 moles) of the diol, represented by formula (II), and 1560 grams (15 moles) of 2,2-dimethoxypropane were placed in a beaker and mixed with a magnetic stirrer. After the mixing, 2.0 grams of p-toluenesulfonic acid monohydrate were added. Instantly the reaction mixture became clear and the temperature dropped from 21° to 16°C. Gas liquid chromatographic analysis indicated completion of the reaction. Immediately, the methanol and the excess dimethoxypropane were removed in a vacuum rotary evaporator at a bath temperature of 40° to 45°C. and the ketal represented by formula (VII) was obtained.

The ketal, represented by formula (VII), is very unstable in solid state, and it is imperative to dissolve it in benzene immediately after the removal of methanol and the excess dimethoxypropane were removed in a vacuum rotary evaporator at a bath temperature of 40° to 45°C. and the ketal represented by formula (VII) was obtained.

The ketal, represented by formula (VII), is very unstable in solid state, and it is imperative to dissolve it in benzene immediately after the removal of methanol and the excess dimethoxypropane.

EXAMPLE 4

Hydrogenation of 3,4-Bis(Hydroxymethyl) Furan-Isopropylidene Ketal to cis 3,4-Bis (Hydroxymethyl)Tetrahydrofuran-Isopropylidene Ketal

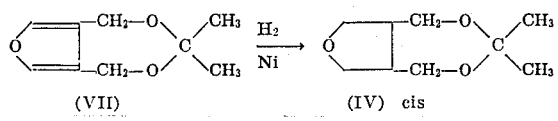

The ketal, represented by formula (VII) (from Example 3 — theoretically 860 grams) was dissolved in 700 ml benzene and placed in a gallon autoclave. Standard Ni catalyst (23% Ni) 225 grams in 300 ml benzene and 1 gram sodium methoxide were added and the ketal, represented by formula (VII) was hydrogenated at 125°C. and 1,100 psig ($H_2$) for 4.5 hours. After completion of the hydrogenation, the catalyst was filtered and most of the benzene was distilled. Ketal (IV) was characterized by gas liquid chromatography and without further purification hydrolyzed to the cis diol, represented by formula (VI). hydrolysis of the ketal, represented by formula (IV), to cis 3,4-bis(hydroxymethyl)tetrahydrofuran is accomplished by the method of Example 5.

EXAMPLE 5

Hydrolysis of Ketal (IV) — Isolation of cis 3,4-Bis(Hydroxymethyl)Tetrahydrofuran

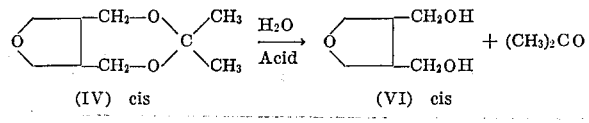

800 Grams (4.65 moles) of the ketal, represented by formula (IV), were hydrolyzed with 1.5 grams of p-toluenesulfonic acid monohydrate and 200 ml of $H_2O$. The reaction mixture was stirred for 0.5 to 1 hour at room temperature. The progress of the hydrolysis was followed by gas liquid chromatography. The reaction mixture was then neutralized with aqueous sodium hydroxide (2.0 grams/50 ml $H_2O$) to make the reaction mixture slightly alkaline, that is, a pH of about 8 to 9.

After stripping water and dimethyl ketone, the cis diol (VI) was distilled under reduced pressure of 0.1 mm Hg at 120°C.

EXAMPLE 6 cis 3,4-Bis(Tosyloxymethyl)Tetrahydrofuran (VIII)

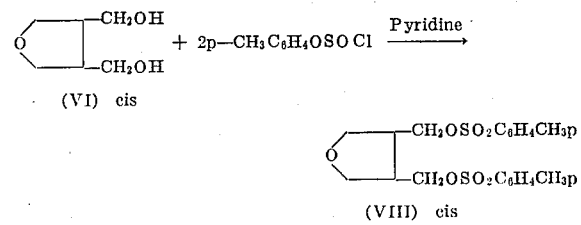

To a three-neck flask equipped with a thermometer, reflux condenser, mechanical stirrer, and dropping funnel were added 528.64 grams (4.0 moles) of the cis diol, represented by formula (VI), and 500 ml pyridine; and the mixture was cooled to 0° to 5°C. A solution of 1557 grams (8 moles) of p-toluenesulfonyl chloride in 1,300 ml pyridine was added slowly through the dropping funnel. The temperature during the addition was kept below 10°C. After the addition of p-toluenesulfonyl chloride, the reaction mixture was stirred for 2 to 3 hours and then let stand at room temperature overnight.

The reaction mixture was poured over ice-water and stirred for 30 minutes; then the aqueous layer was decanted. The product was further purified by washing with distilled water.

EXAMPLE 7

Reaction of cis 3,4-Bis (Tosyloxymethyl)Tetrahydrofuran and Ammonia

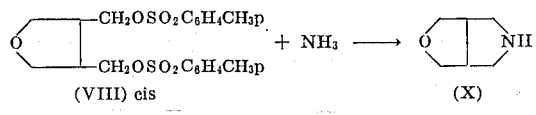

cis 3,4-Bis(tosyloxymethyl)tetrahydrofuran (190 grams), illustrated by formula (VIII), and liquid ammonia (100 grams) in a 1 liter of absolute ethanol were heated at 150°C. for 2 hours at 600 psig in a one-gallon autoclave. The reaction mixture was cooled, treated with a methanolic sodium hydroxide solution (34.5 grams NaOH in 200 ml $CH_3OH$), filtered, and the solid washed with diethyl ether. The filtrate and ethereal washings were combined and the solvents were stripped at atmospheric pressure. Additional sodium p-toluenesulfonate, which precipitated when most of the solvents were distilled, was removed by filtration, and the stripping was continued. The product (X) was distilled at atmospheric pressure at 182° to 188°C.

EXAMPLE 8

5-Benzyl-Hexahydro-1H-Furo(3,4-c Pyrrole (IX)

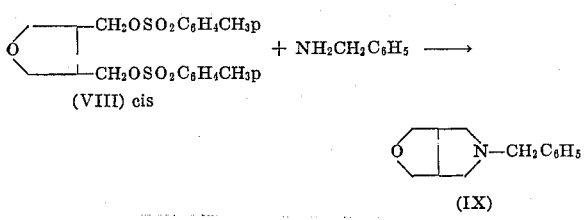

In a three-neck flask equipped with a mechanical stirrer, thermometer, and reflux condenser were placed 484.5 grams (1.1 moles) of the ditosylate, represented by formula (VIII), 353.6 grams (3.3 moles) of benzylamine and 500 ml of Ansul 141 (diethylene glycol dimethyl ether). The mixture was heated to 140°C., at which point the reaction became rather vigorous. The heating mantle was removed and the reaction mixture was cooled with cold water until the vigorous reaction subsided; then the reaction mixture was heated at 160°C. for 2.5 hours. The mixture was then cooled to 30° to 40°C. and a methanolic sodium hydroxide solution (88 grams NaOH in 400 ml $CH_3OH$) was added while stirring. Methanol (100 to 200 ml) should be added prior to the sodium hydroxide addition if the reaction mixture becomes too viscous when cooled to 30° to 40°C.

After stirring for 0.5 hour, the sodium tosylate was filtered and washed with ethyl ether/methanol (95:5). The filtrate and ether/methanol washings were combined and the organic solvents stripped under reduced pressure. During the stripping of solvents, additional salt precipitated and this was filtered and washed with ether/methanol. The solvents from the combined filtrates were stripped and product represented by formula (IX) distilled at 95° to 105°C./0.15 mm Hg.

The hydrochloride salt was formed by dissolving product (IX) in ether and passing in anhydrous HCL gas. The HCL salt of the product, represented by formula (IX), has a melting point of 182° to 183°C.

Analysis ($C_{13}H_{18}NOCl$). Calculated: C, 65.12%; H, 7.57%; N, 5.84%; Cl, 14.79%. Found: C, 65.12%; H, 7.55%; N, 5.86%; Cl, 14.74%.

EXAMPLE 9

Hexahydro-1H-Furo(3,4-c)Pyrrole (X) Prepared by Debenzylation of 5-Benzyl-Hexahydro-1H-Furo(3,4-c)Pyrrole

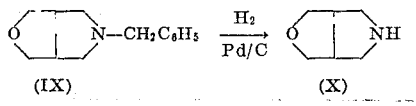

5-Benzyl-hexahydro-1H-furo(3,4-c)pyrrole, illustrated by formula (IX) (502 grams, 2.47 moles), 10% Palladium on carbon (30 grams), and 675 ml of absolute ethanol were placed in a one-gallon autoclave. Hydrogen was added and the mixture was heated at 70°–75°C. for 4 hours at 70 psig. The reaction was monitored by the absorption of $H_2$ and gas liquid chromatographic analysis. The catalyst was filtered over Super Cel (diatomaceous earth) and the ethanol was stripped at atmospheric pressure. The product (X), a clear colorless liquid, distilled at 182° to 188°C.

Analysis ($C_6H_{11}NO$). Calculated: C, 63.66%; H, 9.82%; N, 12.37%. Found: C, 63.55%; H, 9.78%; N, 12.14%.

As indicated above, the product of the present invention is useful as an analgesic in animals when administered in a therapeutically effective amount. In general, an effective dose of the compound of the present process is from about 0.5 milligrams to about 400 per kilogram body weight one to four times a day.

As the product of the present invention is effective upon oral administration, hexahydro-1H-furo(3,4-c)pyrrole can be compounded into any suitable oral dosage form, such as in a syrup, elixir, solution, suspension, or any other suitable dosage form by procedures well known in the pharmaceutical art. For example, liquid dosage forms can be prepared by dissolving, dispersing, or suspending sufficient compound of the present process with a suitable flavored liquid so that the product will contain from about 15 milligrams to 5,000 milligrams of hexahydro-1H-furo(3,4-c)pyrrole per dosage unit. The following is an example of one such suitable pharmaceutical prepartion.

| Suspension Containing 50 mg per 5 cc of Hexahydro-1H-Furo(3,4-c)Pyrrole | |
|---|---|
| Hexahydro-1H-Furo(3,4-c)Pyrrole | 10 grams |
| Tragacanth | 50 grams |
| Amaranth | 10 grams |
| Syrup Wild Cherry | 60 ml |
| Distilled Water, q.s. | 1,000 ml |

Hydrate the tragacanth with sufficient water to form a smooth paste and to this add the hexahydro-1H-furo(3,4-c) pyrrole, followed by the amaranth which has been previously dissolved in water. Then add the syrup of wild cherry and add distilled water to make 1,000 ml.

Having thus described my invention, I claim:

1. A process of making hexahydro-1H-furo(3,4-c)pyrrole comprising (a) reacting 3,4-bis(hydroxymethyl)furan with a ketone or aldehyde to form 3,4-bis(hydroxymethyl)furan-ketal or -acetal or reacting 3,4-bis(hydroxymethyl)furan with a low molecular weight ketal or acetal by a ketal or acetal interchange reaction to form the corresponding 3,4-bis(hydroxymethyl)furan-ketal or -acetal; (b) hydrogenating the product of step (a) to form the corresponding cis 3,4-bis(hydroxymethyl)tetrahydrofuran-ketal or -acetal; (c) hydrolyzing the product of step (b) to form cis 3,4-bis(hydroxymethyl)tetrahydrofuran; (d) reacting the product of step (c) with a compound so as to replace the two hydroxyl groups of the product of step (c) with two groups selected from the group consisting of sulfonyl groups or halogens; and then (e) reacting the product of step (d) with ammonia to yield the named product or reacting the product of step (d) with an alkylamine or aralkylamine to form the corresponding cyclized product which in turn is dealkylated or dearalkylated yield the named product.

2. A process of making hexahydro-1H-furo(3,4-c)pyrrole comprising: (a) reacting 3,4-bis(hydroxymethyl)furan with 2,2-dimethoxypropane to form 3,4-bis(hydroxymethyl)furan-isopropylidene ketal; (b) hydrogenating the product of step (a) to form cis 3,4-bis(hydroxymethyl)tetrahydrofuran-isopropylidene ketal; (c) hydrolyzing the product of step (b) to form cis 3,4-bis (hydroxymethyl)tetrahydrofuran; (d) reacting the product of step (c) with a compound so as to replace the two hydroxyl groups of the product of step (c) with two groups selected from the group consisting of sulfonyl groups or halogens; and then (e) reacting the product of step (d) with ammonia to yield hexahydro-1H-furo(3,4-c)pyrrole.

3. A process of claim 1 wherein the product of step (e) is reacted with benzylamine to form 5-benzyl-hexahydro-1H-furo (3,4-c)pyrrole which in turn is debenzylated to form hexahydro-1H-furo(3,4-c)pyrrole.

* * * * *

UNITED STATES PATENT OFFICE
CERTIFICATE OF CORRECTION

Patent No. 3,855,237   Dated December 17, 1974

Inventor(s) George C. Gatos

It is certified that error appears in the above-identified patent and that said Letters Patent are hereby corrected as shown below:

Under "References Cited", "Chemical Abstracts, Vol. 71, (1969), p. 124295K, pg. 144." should read "Chemical Abstracts, Vol. 71, (1969), p. 124295K, pg. 444."

Column 4, last two lines and first five lines in column 5 should be deleted.

Column 6, line 14, "squeous" should read "aqueous".

Column 7, lines 15 and 16, "HCL" should read "HCl".

Signed and sealed this 13th day of May 1975.

(SEAL)
Attest:

RUTH C. MASON
Attesting Officer

C. MARSHALL DANN
Commissioner of Patents
and Trademarks